US012749837B2

(12) United States Patent
Xue

(10) Patent No.: US 12,749,837 B2
(45) Date of Patent: Sep. 29, 2026

(54) INTERNAL STRUCTURE OF SOCKET AND SOCKET

(71) Applicant: Jingle Xue, Zhumadian City (CN)

(72) Inventor: Jingle Xue, Zhumadian City (CN)

( * ) Notice: Subject to any disclaimer, the term of this patent is extended or adjusted under 35 U.S.C. 154(b) by 259 days.

(21) Appl. No.: 18/614,723

(22) Filed: Mar. 24, 2024

(65) Prior Publication Data

US 2025/0253569 A1 Aug. 7, 2025

(30) Foreign Application Priority Data

Feb. 3, 2024 (CN) ......................... 202420269341.8

(51) Int. Cl.

| | |
|---|---|
| ***H01R 13/11*** | (2006.01) |
| ***H01R 13/502*** | (2006.01) |
| ***H01R 24/78*** | (2011.01) |
| ***H01R 25/00*** | (2006.01) |
| *H01R 13/03* | (2006.01) |
| *H01R 13/52* | (2006.01) |

(52) U.S. Cl.

CPC ......... *H01R 13/113* (2013.01); *H01R 13/502* (2013.01); *H01R 24/78* (2013.01); *H01R 25/006* (2013.01); *H01R 13/03* (2013.01); *H01R 13/5227* (2013.01)

(58) Field of Classification Search

CPC .... H01R 13/113; H01R 13/502; H01R 13/03; H01R 13/5227; H01R 24/78; H01R 25/006

USPC .......................................................... 439/686

See application file for complete search history.

(56) References Cited

U.S. PATENT DOCUMENTS

| | | | | |
|---|---|---|---|---|
| 7,347,708 | B1 * | 3/2008 | Huang ................. | H01R 13/639 439/263 |
| 9,905,969 | B1 * | 2/2018 | Baldwin ................ | H01R 24/76 |
| 11,316,298 | B1 * | 4/2022 | Ding .................... | H01R 13/115 |
| 11,431,122 | B2 * | 8/2022 | Quan ..................... | H01R 24/20 |
| 11,456,555 | B1 * | 9/2022 | Lin .................... | H01R 13/4534 |
| 11,728,597 | B1 * | 8/2023 | Lee ...................... | H01R 13/642 439/134 |
| 11,824,309 | B2 * | 11/2023 | Abouismail ....... | H01R 13/6395 |
| 12,170,428 | B2 * | 12/2024 | Lin ........................ | H01R 13/11 |
| 12,266,881 | B2 * | 4/2025 | Li ...................... | H01R 13/4534 |
| 12,413,006 | B2 * | 9/2025 | Li ...................... | H01R 13/4534 |
| 12,512,637 | B1 * | 12/2025 | Wu ........................ | H01R 27/00 |
| 2018/0198216 | A1 * | 7/2018 | Scanzillo ........... | H01R 4/48365 |

* cited by examiner

*Primary Examiner* — Harshad C Patel
(74) *Attorney, Agent, or Firm* — Li & Cai Intellectual Property Office

(57) ABSTRACT

An internal structure of a socket includes an insulating liner bottom shell, an insulating liner upper cover and conductive contact sheet assemblies. An upper end surface of the insulating liner upper cover is provided with socket holes, the insulating liner bottom shell has a cavity, and a partition is provided in the insulating liner bottom shell and divides the cavity into a first cavity and a second cavity. One socket hole of the insulating liner upper cover is arranged above the first cavity, and another socket hole is arranged above the second cavity. One conductive contact sheet assembly is accommodated in the first cavity, and another conductive contact sheet assembly is accommodated in the second cavity. The conductive contact sheet assembly includes a conductive elastic member and a contact sheet that are independent from each other.

20 Claims, 16 Drawing Sheets

INTERNAL STRUCTURE OF SOCKET AND SOCKET

FIELD OF THE DISCLOSURE

The present disclosure relates to the technical field of sockets, and more particularly to an internal structure of a socket and a socket.

BACKGROUND OF THE DISCLOSURE

A socket refers to a socket into which one or more circuit wirings can be inserted, through which various wirings can be inserted to facilitate connection with other circuits. The power socket is an electrical device that provides a power interface for household appliances, and is also a commonly used electrical accessory in residential electrical design and closely related to people's lives.

For children with low safety awareness may insert iron nails, copper wires or other conductive objects into jacks of sockets out of curiosity, or insert their hands into jacks of sockets, which can easily lead to electric shock accidents. Since sockets are now everywhere, it is not easy to keep sockets out of reach of children. Therefore, the only way to prevent electric shock accidents is to improve the anti-shock performance of sockets.

In addition, in daily life, sockets are also used in places with a lot of water vapor such as kitchens and bathrooms. Since there is sufficient water vapor in these places, water vapor will accumulate inside the sockets. Even adults with a strong sense of safety may get an electric shock when using these sockets containing water vapor.

Based on this, it is necessary to provide a socket with better safety performance.

SUMMARY OF THE DISCLOSURE

The purpose of the present disclosure is to provide an internal structure of a socket and a socket in view of the defects and shortcomings of the existing technology, which has the advantage of effectively preventing electric shock accidents.

In order to achieve the above purpose, the technical solution adopted by the present disclosure is to provide an internal structure of a socket, which includes an insulating liner bottom shell, an insulating liner upper cover covering the insulating liner bottom shell, and at least two conductive contact sheet assemblies accommodated in the insulating liner bottom shell and a part of the conductive contact sheet extending to a front side of the insulating liner bottom shell. The part of the conductive contact sheet assembly extending to the front side of the insulating liner bottom shell is configured to contact a conductive sheet of the socket. Socket holes are correspondingly provided on an upper end surface of the insulating liner upper cover. The insulating liner bottom shell is provided with a cavity for accommodating the conductive contact sheet assembly, at least one partition is provided in the insulating liner bottom shell, the partition divides the cavity into a first cavity and a second cavity that are independent from each other, one socket hole of the insulating liner upper cover is arranged above the first cavity, and another socket hole of the insulating liner upper cover is arranged above the second cavity. One conductive contact sheet assembly is accommodated in the first cavity, another conductive contact sheet assembly is accommodated in the second cavity, and the conductive contact sheet assembly includes a conductive elastic member, has a clamping part located on a lower side of the socket hole for contacting with an external plug electrode, and an elastic pin extending from the clamping part to a front side of the clamping part, in which the elastic pin partially extends to the lower side of the socket hole and adjacent to a front side of the socket hole; and a contact sheet. The contact sheet is provided separately from the conductive elastic member, arranged on a front side of the elastic pin of the conductive elastic member, and configured to contact the conductive sheet. When the external plug electrode is inserted, the external plug electrode is in contact with the clamping part of the conductive elastic member while the external plug electrode presses the elastic pin of the conductive elastic member, and the elastic pin is squeezed to move forward, so that an end of the elastic pin is in contact with the contact sheet, and then the external plug electrode, the conductive elastic member, the contact sheet and the conductive sheet are sequentially in contact with and conducted with each other. When the external plug electrode is pulled out, the external plug electrode is not in contact with the clamping part of the conductive elastic member while the elastic pin is not squeezed by the external plug electrode, so that the elastic pin resets.

Further, the conductive elastic member includes a conductive contact sheet, in which the conductive contact sheet has the clamping part, and a first fixing part extending from the clamping part to the front side of the clamping part; and a conductive spring sheet. The conductive spring sheet has a second fixing part fixedly connected to the first fixing part of the conductive contact sheet, the elastic pin extending from the second fixing part and having an end arranged on the front side of the elastic pin, and a contact head provided at the end of the elastic pin.

Further, the elastic pin has a base extending part, in which the base extending part extends from the second fixing part and has a plurality of bends; a first extending part extending obliquely upward from an end of the base extending part; a second extending part, in which the second extending part extends from an end of the first extending part and bends and extends downward; and a third extending part, in which the third extending part extends from an end of the second extending part and extends downward and forward; in which the contact head is arranged at an end of the third extending part.

Further, a first riveting hole is provided on the first fixing part of the conductive contact sheet, a second riveting hole corresponding to the first riveting hole is provided on the second fixing part of the conductive spring sheet, and the second fixing part is fixed to the first fixing part by riveting.

Further, the conductive spring sheet is made of phosphor copper and the conductive contact sheet is made of brass.

Further, a first leakage hole is provided on a bottom surface of the first cavity, a second leakage hole is provided on a bottom surface of the second cavity, an area of the one socket hole above the first cavity is smaller than an area of the first leakage hole, and an area of the another socket hole above the second cavity is smaller than an area of the second leakage hole. Alternatively, a plurality of first leakage holes are provided on the bottom surface of the first cavity, a plurality of second leakage holes are provided on the bottom surface of the second cavity, the area of the one socket hole above the first cavity is smaller than a sum of areas of the plurality of first leakage holes, and the area of the another socket hole above the second cavity is smaller than a sum of areas of the plurality of second leakage holes.

Further, three socket holes are provided on the upper end surface of the insulating liner upper cover. Three conductive contact sheet assemblies are provided, including an L conductive contact assembly accommodated in the first cavity, an N conductive contact assembly accommodated in the second cavity and a grounded conductive contact sheet assembly. Three partitions are provided, including a first partition, a second partition, and a third partition, in which the first partition, the second partition and the third partition divide the cavity into the first cavity, the second cavity, and a third cavity for accommodating the grounded conductive contact sheet assembly, and a further socket hole of the insulating liner upper cover is arranged above the third cavity. A third leakage hole is provided on a bottom surface of the third cavity, and an area of the further socket hole above the third cavity is smaller than an area of the third leakage hole. Alternatively, a plurality of third leakage holes are provided on the bottom surface of the third cavity, and the area of the further socket hole above the third cavity is smaller than a sum of areas of the plurality of third leakage holes.

Further, a raising rib is provided on a lower side of the insulating liner bottom shell to correspondingly raise the first leakage hole, the second leakage hole and the third leakage hole.

The present disclosure further provides a socket, which includes an insulating socket bottom shell, an insulating socket upper cover covering the insulating socket bottom shell, and at least one of the abovementioned internal structures of the socket accommodated in the insulating socket bottom shell.

Further, an inner bottom wall of the insulating socket bottom shell is provided with surrounding walls protruding from the inner bottom wall of the insulating socket bottom shell, the socket liner is assembled on the surrounding walls through the insulating liner bottom shell, a plurality of socket leakage holes spatially communicated with an outside are respectively provided within the surrounding walls, and a raising block is provided on a lower side of the insulating socket bottom shell.

After adopting the above technical solution, the beneficial effects of the present disclosure are as follows.

1. In the present disclosure, the conductive elastic member and the contact sheet are independently arranged. Since the contact sheet is disconnected from the conductive elastic member under normal conditions, even if a user accidentally touches the conductive elastic member adjacent to the socket hole, the electric shock will not occur. In addition, because the elastic pin of the conductive elastic member extends to the lower side of the socket hole and adjacent to the front side of the socket hole, so that when other objects are mistakenly inserted into the socket hole, the elastic pin cannot be squeezed or is difficult to be completely squeezed, and the conductive elastic member will not come into contact with the contact sheet to be conducted with each other, further reducing the risk of electric shock.
2. In the present disclosure, by providing the partition in the insulating liner bottom shell, the partition divides the cavity into the first cavity and the second cavity that are independent from each other. The one conductive contact sheet is accommodated in the first cavity, and the another conductive contact sheet is accommodated in the second cavity. If no plug is inserted into the socket hole, since the insulating liner upper cover and the insulating liner bottom shell are not electrified, splashing of water will not cause a short circuit. When power is on and water enters both socket holes, the water is distributed in the first cavity and the second cavity, and the neutral wire and the live wire cannot form a loop, thereby eliminating the risk of short circuit or leakage.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. The drawings in the following description are only some embodiments of the present disclosure. For those of ordinary skill in the art, other drawings can be obtained based on these drawings without exerting any creative effort.

Figure 1:
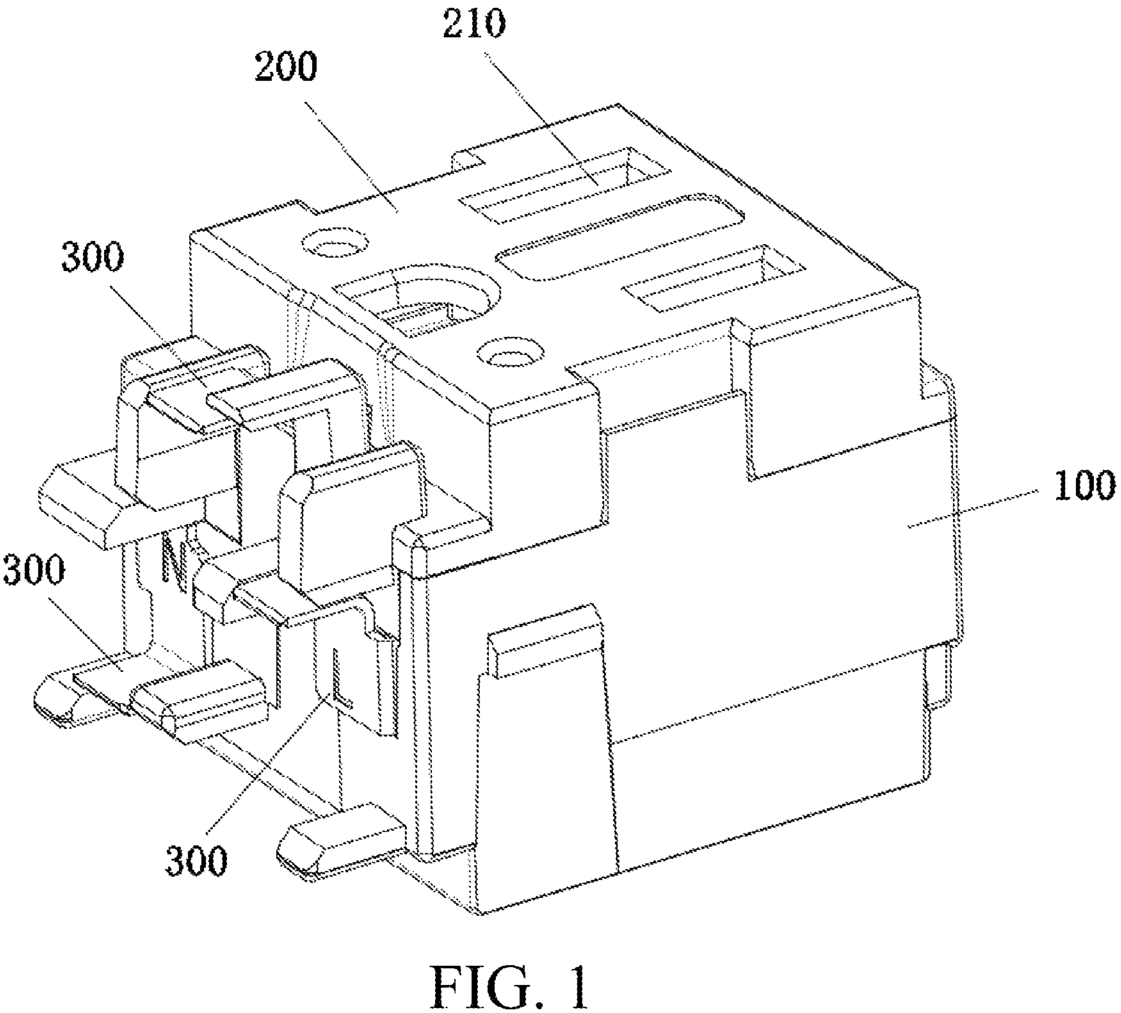
FIG. 1 is a schematic structural diagram of a socket liner.

Reference numeral: a, first cavity; b, second cavity; c, third cavity; d, first leakage hole; e, second leakage hole; f, third leakage hole; g, first crack; h, second crack; 100, insulating liner bottom shell; 110, first partition; 120, second partition; 130, third partition; 140, Heightening ribs; 150, support bump; 160, convex column; 200, insulating liner upper cover; 210, socket hole; 300, conductive contact sheet assembly; 310, conductive contact sheet; 311, clamping part; 3111, second guiding surface; 312, first fixing part; 3121, first riveting hole; 320, conductive spring sheet; 321, second fixing part; 3211, second riveting hole; 322, elastic pin; 3221, first extending part; 3222, second extending part; 3223, third extending part; 3224, base extending part; 323, contact head; 330, contact sheet; 331, base; 332, upper clamping sheet; 333, lower clamping sheet; 334, first guiding surface; 400, conductive sheet; 500, insulating socket bottom shell; 510, surrounding wall; 520, socket leakage hole; 530, raising block; 600, insulating socket cover.

DETAILED DESCRIPTION OF THE EXEMPLARY EMBODIMENTS

The present disclosure will be further described in detail below in conjunction with the accompanying drawings.

This specific embodiment is only an explanation of the present disclosure, and is not a limitation of the present disclosure. Those skilled in the art can make modifications to the present embodiment without creative contribution as needed after reading this description, and as long as they are within the scope of the claims of the present disclosure, they are protected by the patent law.

Figure 2:
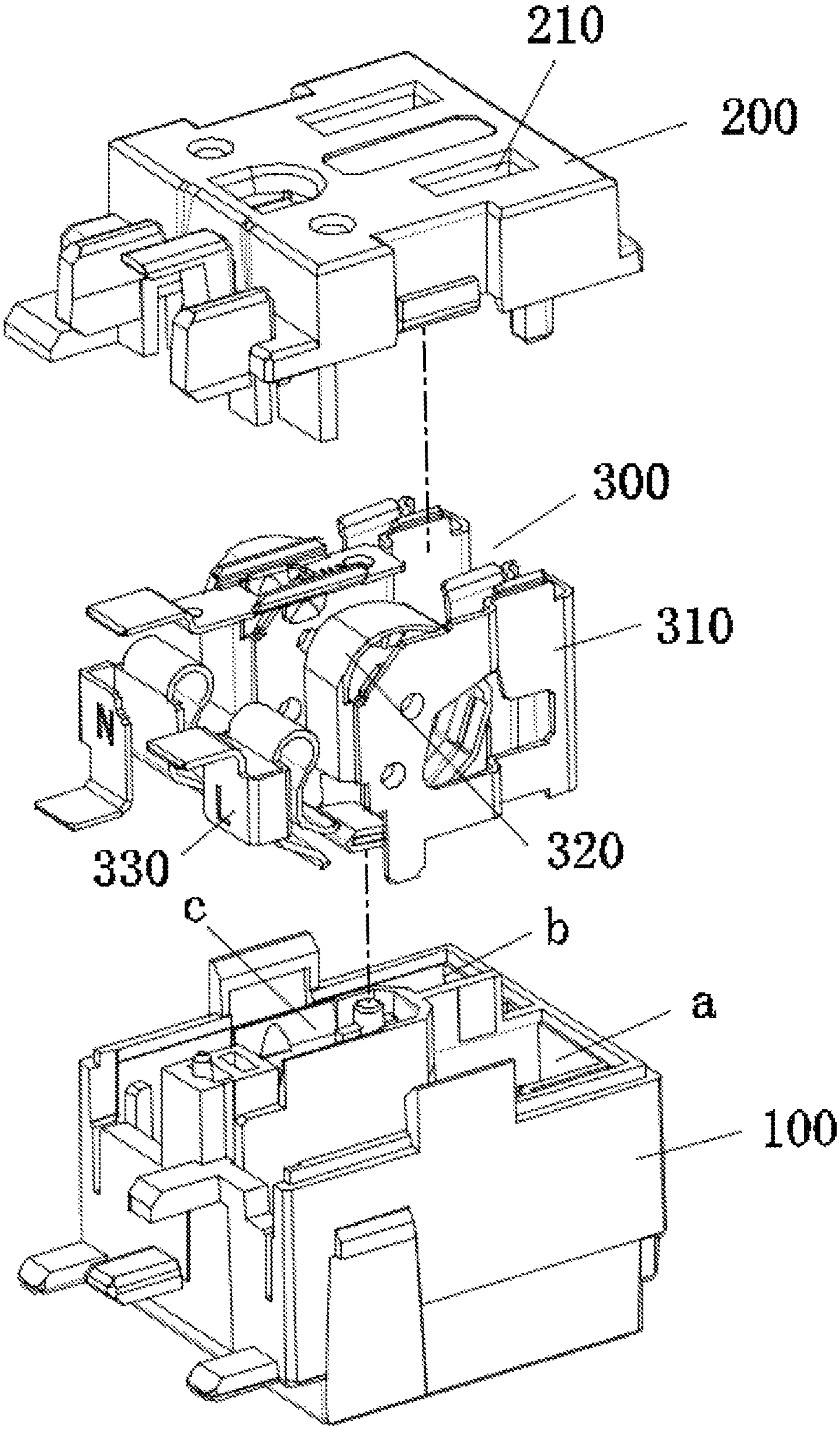
FIG. 2 is a schematic exploded diagram of a structure of the socket liner.
Figure 3:
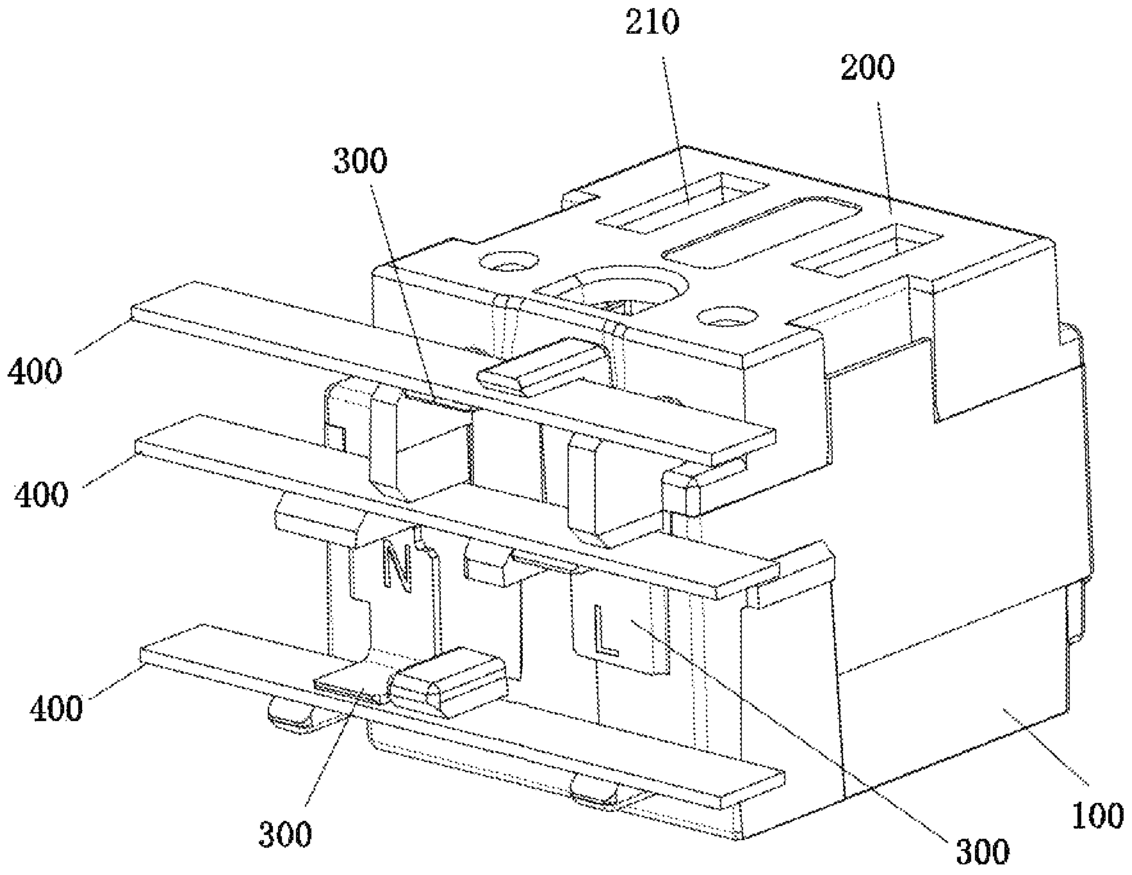
FIG. 3 is a schematic structural diagram of the socket liner and a conductive sheet.
Figure 4:
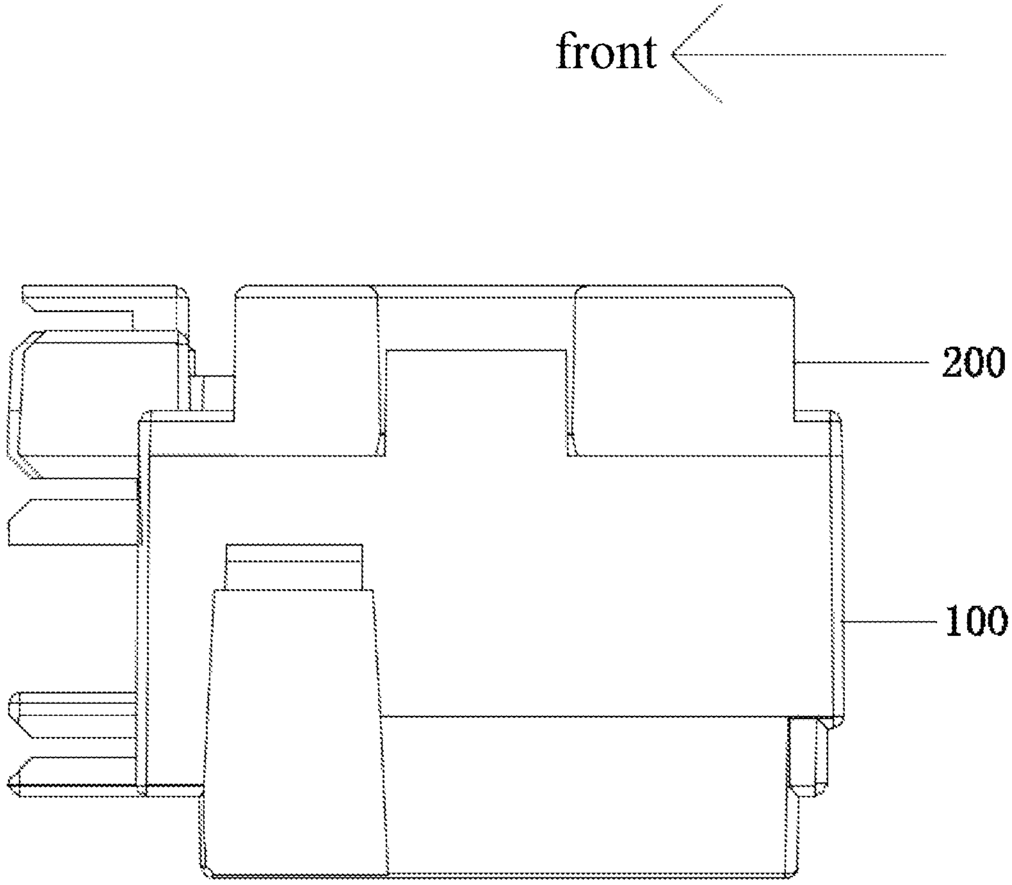
FIG. 4 is a schematic structural diagram of an insulating liner shell.
Figure 5:
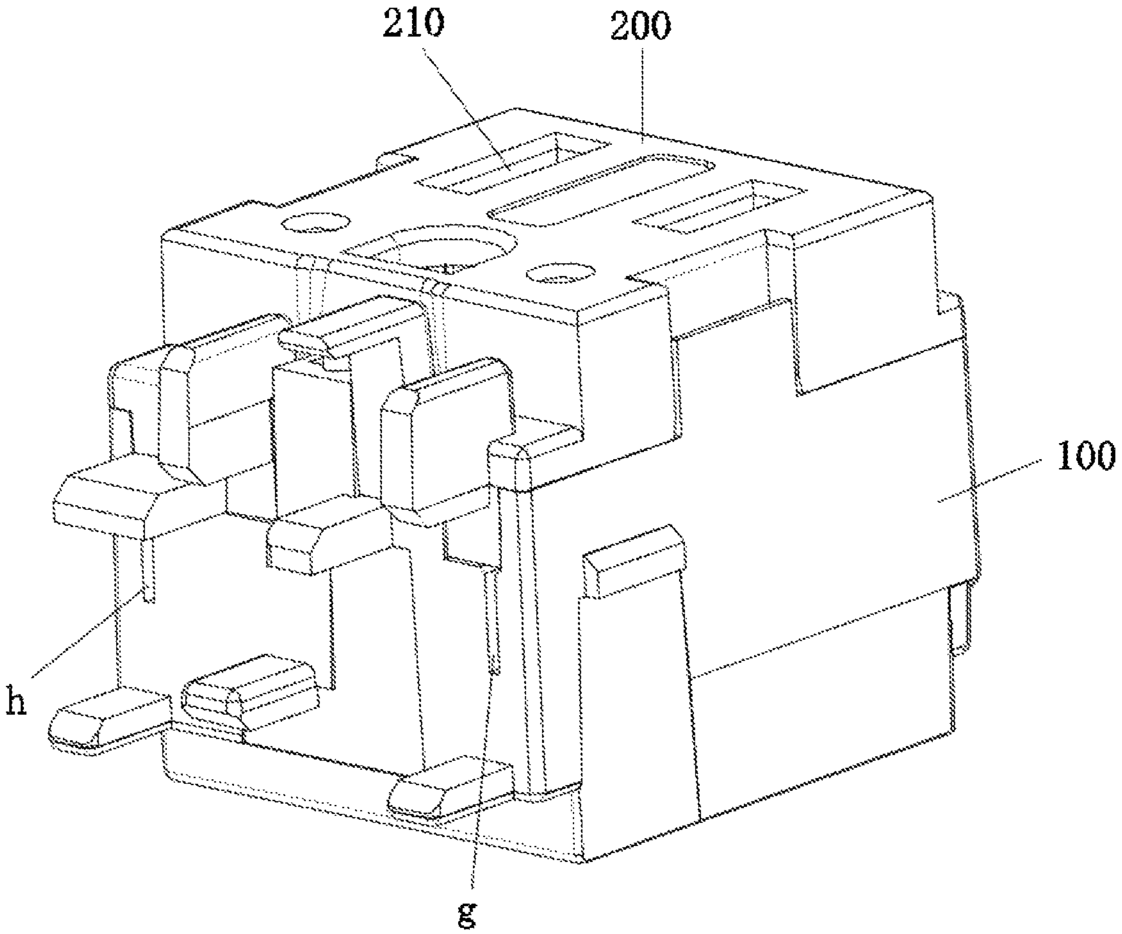
FIG. 5 is a schematic structural diagram of a socket liner shell from another perspective.

The present embodiment relates to an internal structure of a socket, that is, a socket liner. Reference is made to FIGS. 1 and 2, the internal structure of a socket includes an insulating liner bottom shell 100, an insulating liner upper cover 200 covering the insulating liner bottom shell 100, and two conductive contact sheet assemblies 300 accommodated in the insulating liner bottom shell 100, in which a part of the conductive contact sheet assembly 300 extends to a front side of the insulating liner bottom shell 100. Socket holes 210 are correspondingly provided on an upper end surface of the insulating liner upper cover 200. The part of the conductive contact sheet assembly 300 extending to the front side of the insulating liner bottom shell 100 is configured to contact a conductive sheet 400 of the socket.

Reference is made to FIGS. 2, 3, and 10 to 13, in which the conductive contact sheet assembly 300 includes a conductive elastic member and a contact sheet 330. The conductive elastic member has a clamping part 311 arranged on a lower side of the socket hole 210 for contacting an external plug electrode, and an elastic pin 322 extending from the clamping part 311 to a front side of the clamping part 311. The elastic pin 322 partially extends to the lower side of the socket hole 210 and is adjacent to a front side of the socket hole 210. The contact sheet 330 is provided separately from the conductive elastic member, arranged in front of the elastic pin 322 of the conductive elastic member, and is in contact with the conductive sheet 400.

When the external plug electrode is inserted into the socket hole 210, the external plug electrode is in contact with the clamping part 311 of the conductive elastic member while the external plug electrode squeezes the elastic pin 322 of the conductive elastic member, and the elastic pin 322 is squeezed to move forward, so that an end of the elastic pin 322 is brought into contact with the contact sheet 330. Therefore, the external plug electrode, the conductive elastic member, the contact sheet 330, and the conductive sheet 400 are in contact with and conducted with each other in sequence. When the external plug electrode is pulled out from the socket hole 210, the external plug electrode is not in contact with the clamping part 311 of the conductive elastic member while the elastic pin 322 is not squeezed by the external plug electrode, and then the elastic pin 322 is reset.

By independently arranging the conductive elastic member and the contact sheet 330, since the contact sheet 330 is disconnected from the conductive elastic member under normal conditions, even if a user accidentally touches the conductive elastic member adjacent to the socket hole 210, no electric shock will occur. In addition, since the elastic pin 322 of the conductive elastic member partially extends to the lower side of the socket hole 210 and is adjacent to the front side of the socket hole 210, when other objects are mistakenly inserted into the socket hole 210, the elastic pin 322 cannot be squeezed or is difficult to be completely squeezed, and the conductive elastic member will not come into contact with the contact sheet 330 to be conducted with each other, further reducing a risk of electric shock.

Specifically, referring to FIGS. 10 to 14, in the present embodiment, the conductive elastic member includes a conductive contact sheet 310 and a conductive spring sheet 320. The conductive contact sheet 310 has a clamping part 311 and a first fixing part 312 extending from the clamping part 311 to the front side of the clamping part 311. The conductive spring sheet 320 has a second fixing part 321 fixedly connected to the first fixing part 312 of the conductive contact sheet 310, the elastic pin 322 extending from the second fixing part 321 with its end at the front side of the elastic pin 322, and a contact head 323 provided at the end of the elastic pin 322.

The conductive contact sheet 310 and the conductive spring sheet 320 are independently arranged and then fixed together instead of being integrally formed, which greatly reduces a complexity of a mold and lowers a cost of mold opening. In addition, a difficulty of the process can be reduced and materials can be saved.

In the present embodiment, the conductive spring sheet 320 is made of phosphor copper, and the conductive contact sheet 310 and the contact sheet 330 are both made of brass. Phosphor copper has a better rebound effect than brass and can still maintain good elasticity after 5,000 tests or even 10,000 tests. However, the cost of using phosphor copper is much greater than that of brass, so phosphor copper is only used for the conductive spring sheet 320 that require better resilience effects. If the conductive contact sheet 310 and the conductive spring sheet 320 are both made of brass, although the price is low, the resilience of the conductive spring sheet 320 will decrease after repeated use, resulting in poor contact. If the conductive contact sheet 310 and the conductive spring sheet 320 are both made of phosphor copper, although it is superior in performance, the cost is too high. The present disclosure solves the technical problem by using phosphor bronze in the key component, that is, the conductive spring sheet 320.

More specifically, the material of the conductive spring sheet 320 is C5191 phosphor copper.

Figure 13:
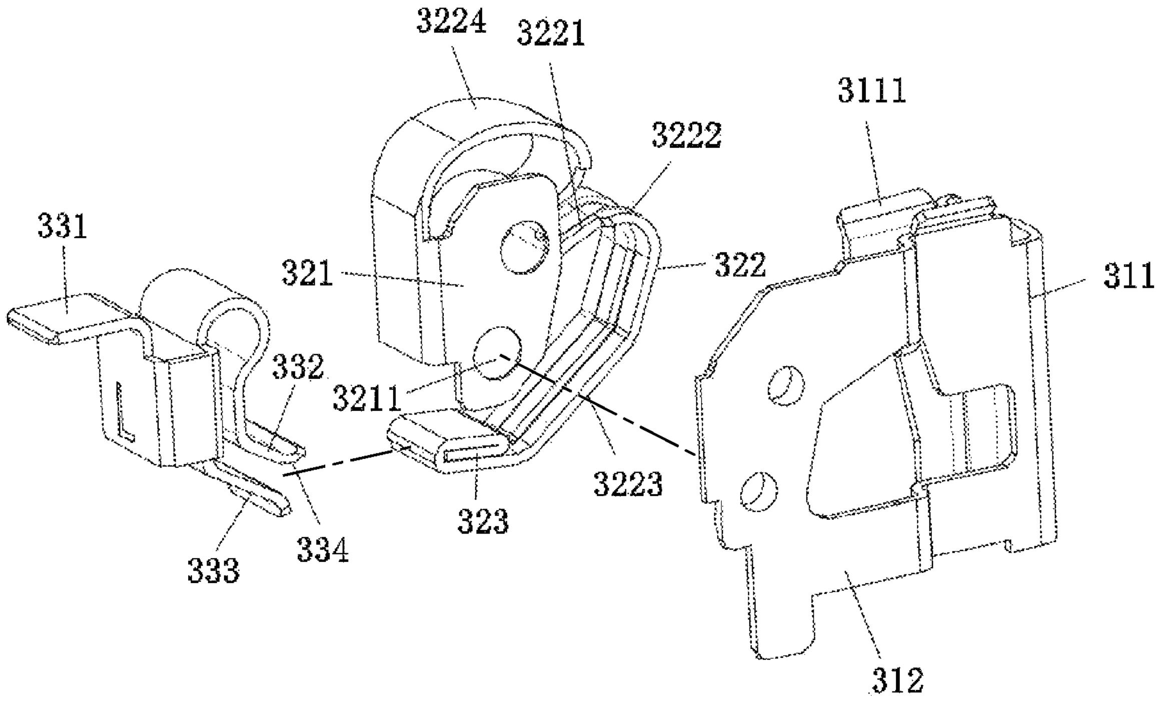
FIG. 13 is a schematic exploded structural diagram of the conductive contact sheet assembly.
Figure 14:
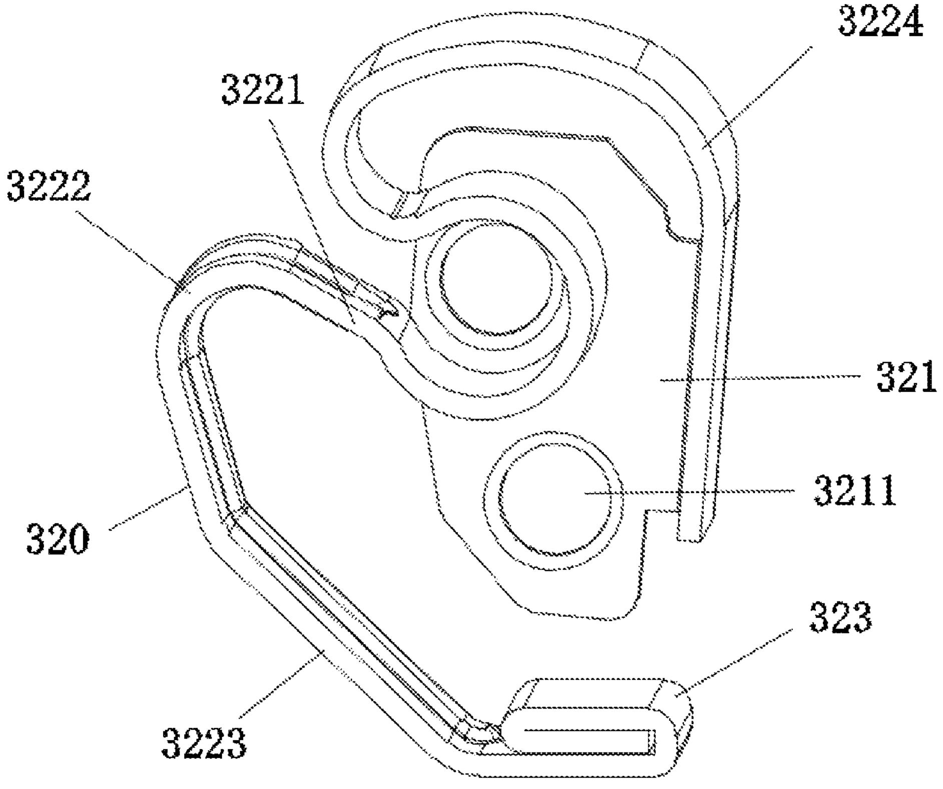
FIG. 14 is a schematic structural diagram of a conductive elastic sheet from another perspective.

Reference is made to FIGS. 13 and 14, in which the elastic pin 322 has a base extending part 3224, a first extending part 3221, a second extending part 3222, and a third extending part 3223.

The base extending part 3224 extends from the second fixing part 321 and has a plurality of bends. The first extending part 3221 extends obliquely upward from an end of the base extending part 3224. The second extending part 3222 extends from an end of the first extending part 3221 to the end part extends and bends downward. The third extending part 3223 extends from an end of the second extending part 3222 and extends downward and forward. The contact head 323 is provided at an end of the third extending part 3223. Such structural design effectively improves the elasticity of the elastic pin 322.

Reference is made to FIG. 13, in which the contact sheet 330 includes a base 331, an upper clamping sheet 332 extending from the base 331 to a rear side of the base 331 and located above a front side of the contact head 323 of the conductive spring sheet 320, and a lower clamping sheet 333 extending from the base 331 to the rear side of the base 331 and located below the front side of the contact head 323 of the conductive spring sheet 320. The elastic pin 322 is squeezed to move and enter between the upper clamping sheet 332 and the lower clamping sheet 333 to hold the upper clamping sheet 332 and the lower clamping sheet 333 apart and achieve contact and conduction with the upper clamping sheet 332 and the lower clamping sheet 333. The contact sheet 330 is arranged to have the upper clamping sheet 332 and the lower clamping sheet 333, and a distance between the upper clamping sheet 332 and the lower clamping sheet 333 is less than a thickness of the contact head 323.

With such arrangement, when the contact head 323 follows a movement path and enters between the upper clamping sheet 332 and the lower clamping sheet 333, the upper clamping sheet 332 and the lower clamping sheet 333 are inevitably held apart, and the upper clamping sheet 332 and the lower clamping sheet 333 will be clamped on both sides of the contact head 323 under an action of elastic force, thereby ensuring good contact between the contact sheet 330 and the conductive spring sheet 320. In order to make the contact head 323 enter between the upper clamping sheet 332 and the lower clamping sheet 333 more smoothly, each of the upper clamping sheet 332 and the lower clamping sheet 333 has an outwardly open first guiding surface 334 outwardly open at one end adjacent to the elastic pin 322.

Reference is made to FIGS. 10 to 13, in which the clamping part 311 of the conductive contact sheet 310 is in the shape of a sheet and is folded into a U shape, and the first fixing part 312 is in the shape of a sheet. An upper end of the clamping part 311 has a second guiding surface 3111 that is outwardly open. A function of the second guiding surface 3111 is to make the external plug electrode enter the clamping part 311 more smoothly.

Figure 11:
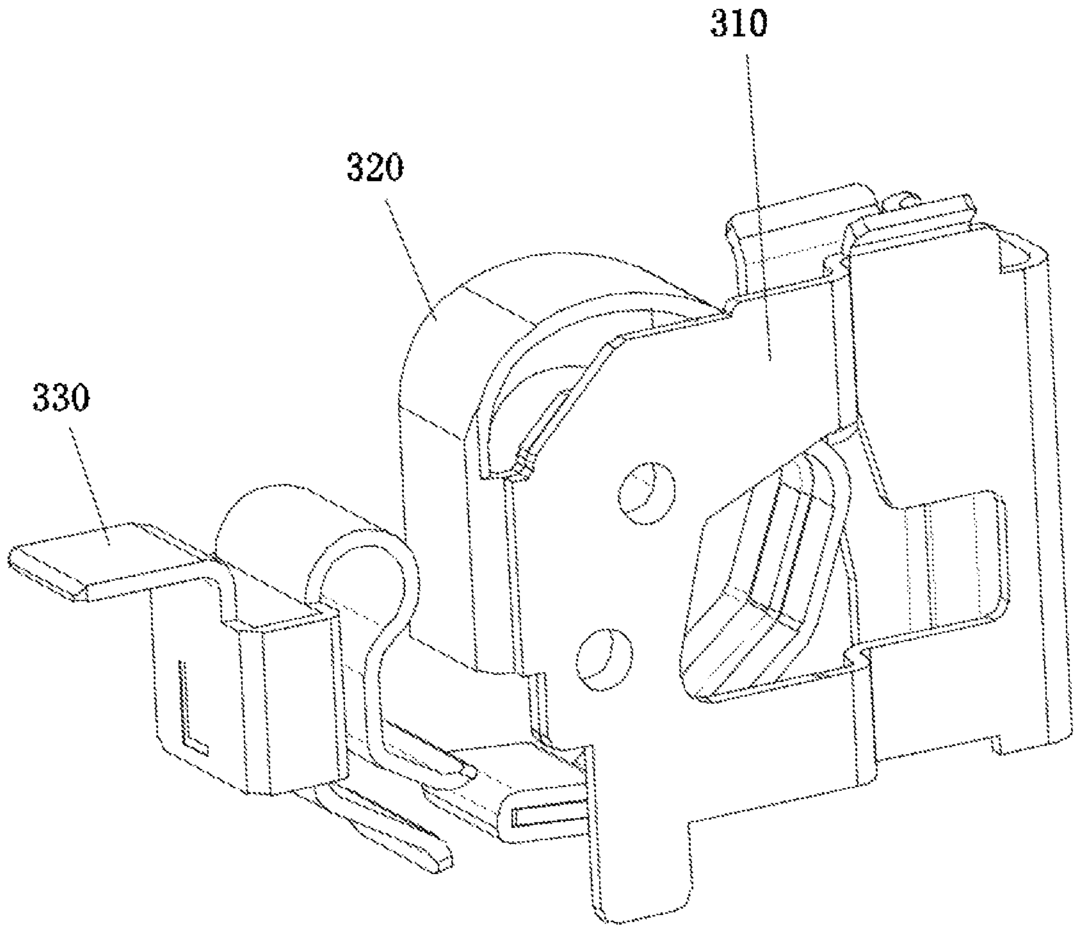
FIG. 11 is a schematic structural diagram of the conductive contact sheet assembly from another perspective.
Figure 12:
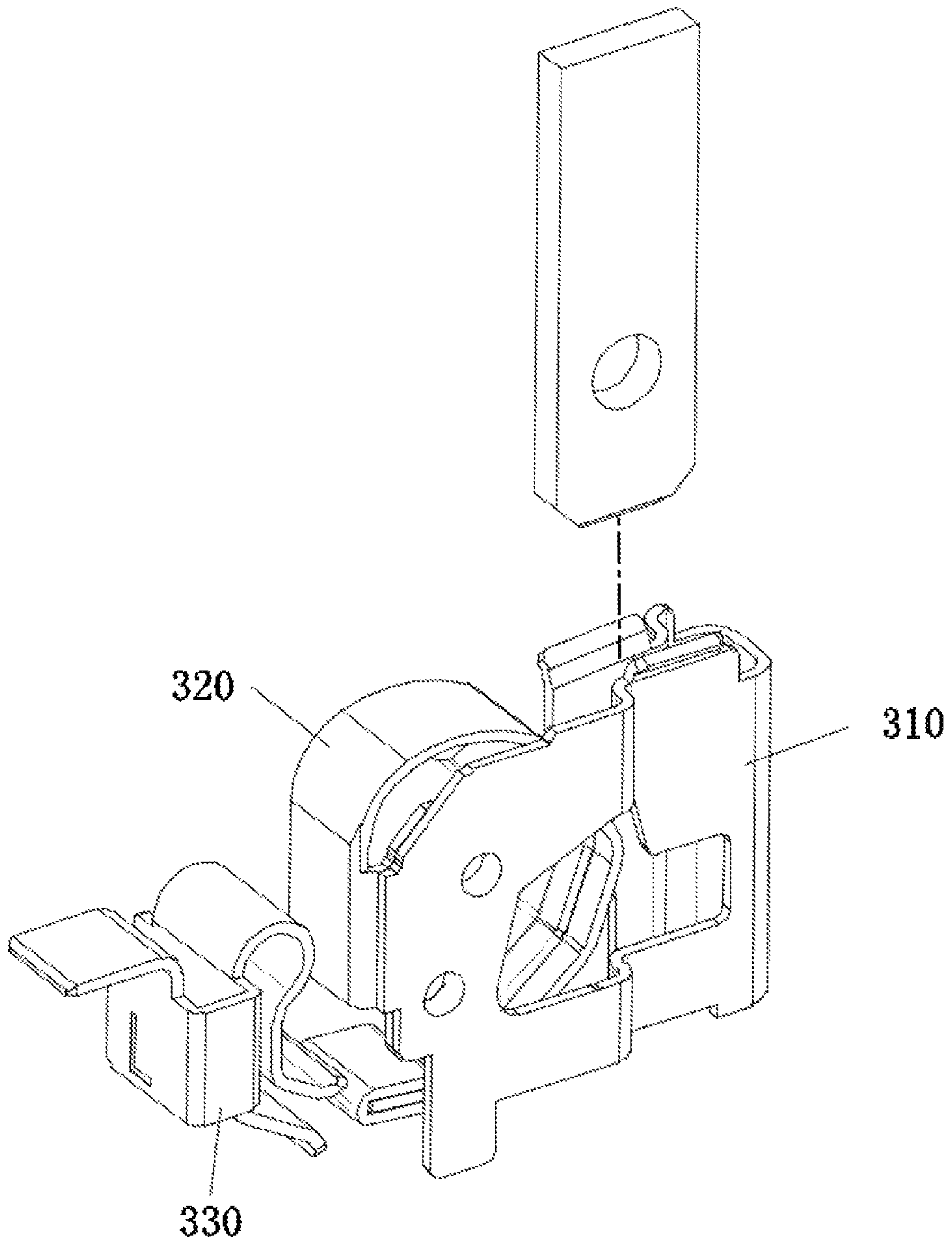
FIG. 12 is a schematic structural diagram of the external plug electrode and conductive contact sheet assembly.

Reference is made to FIGS. 11 to 13, in which the first fixing part 312 of the conductive contact sheet 310 is provided with a first riveting hole 3121, and the second fixing part 321 of the conductive spring sheet 320 is provided with a second riveting hole 3211 corresponding to the first riveting hole 3121. The second fixing part 321 is fixed to the first fixing part 312 by riveting. Specifically, in the present embodiment, the first fixing part 312 of the conductive contact sheet 310 is provided with two first riveting holes 3121, and the second fixing part 321 of the conductive spring sheet 320 is provided with two second riveting holes 3211 corresponding to the two first riveting holes 3121. The riveted connection at two points is more stable.

Reference is made to FIGS. 1 to 9, in which the insulating liner bottom shell 100 has a cavity for accommodating the conductive contact sheet assemblies 300. The insulating liner bottom shell 100 is provided with a partition, and the partition divides the cavity into a first cavity a and a second cavity b that are independent. One socket hole 210 of the insulating liner upper cover 200 is arranged above the first cavity a, and another socket hole 210 is arranged above the second cavity b. One conductive contact sheet assembly 300 is accommodated in the first cavity a, and another conductive contact sheet assembly 300 is accommodated in the second cavity b.

If no plug is inserted into the socket hole 210, since the insulating liner upper cover 200 and the insulating liner bottom shell 100 are not electrified, splashing of water will not cause a short circuit. When power is on and water enters both socket holes 210, the water is distributed into the first cavity a and the second cavity b, and a neutral wire and a live wire cannot form a loop, thereby eliminating the risk of short circuit or leakage.

Figure 6:
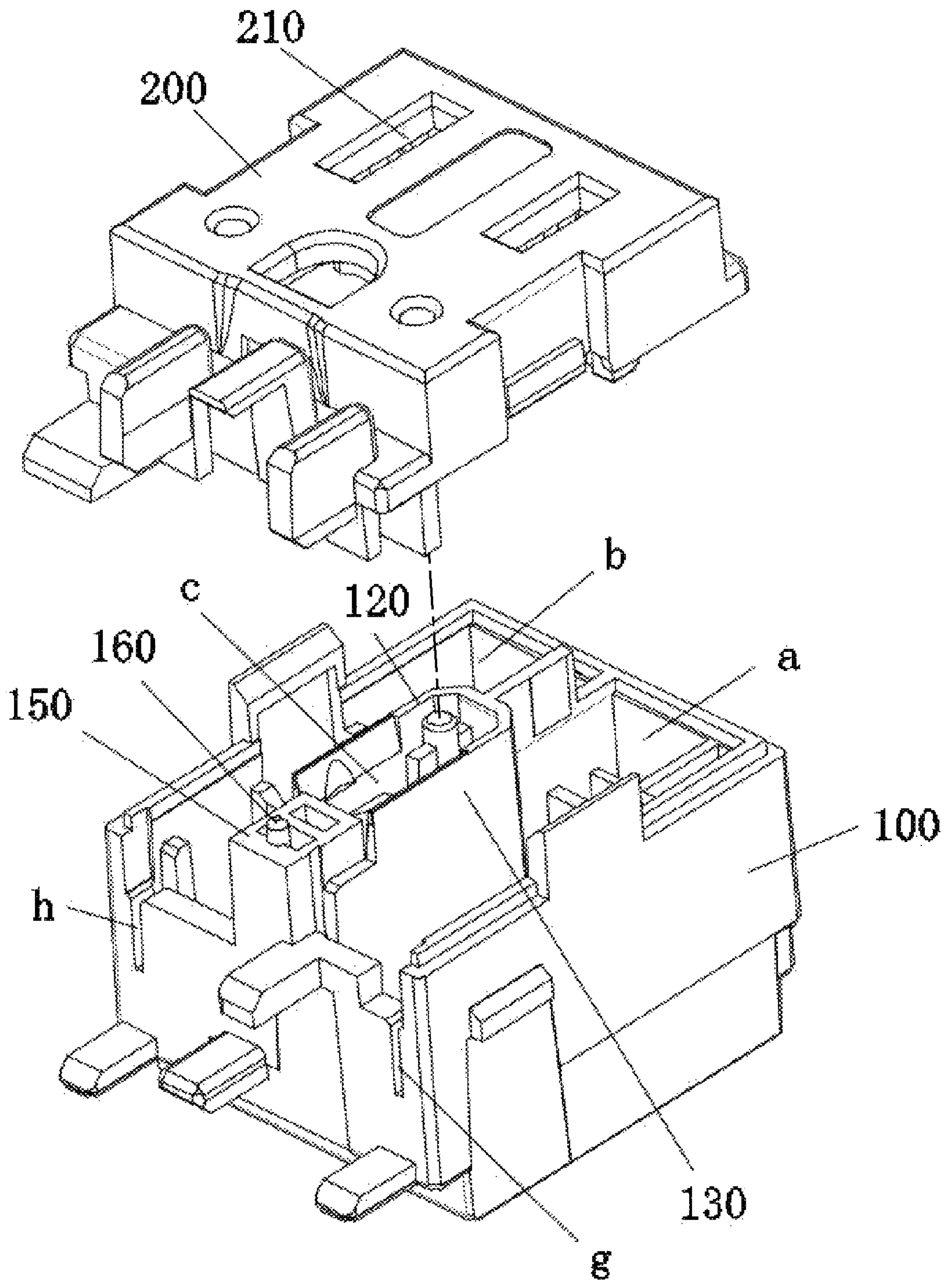
FIG. 6 is a schematic exploded structural diagram of the socket liner shell.
Figure 7:
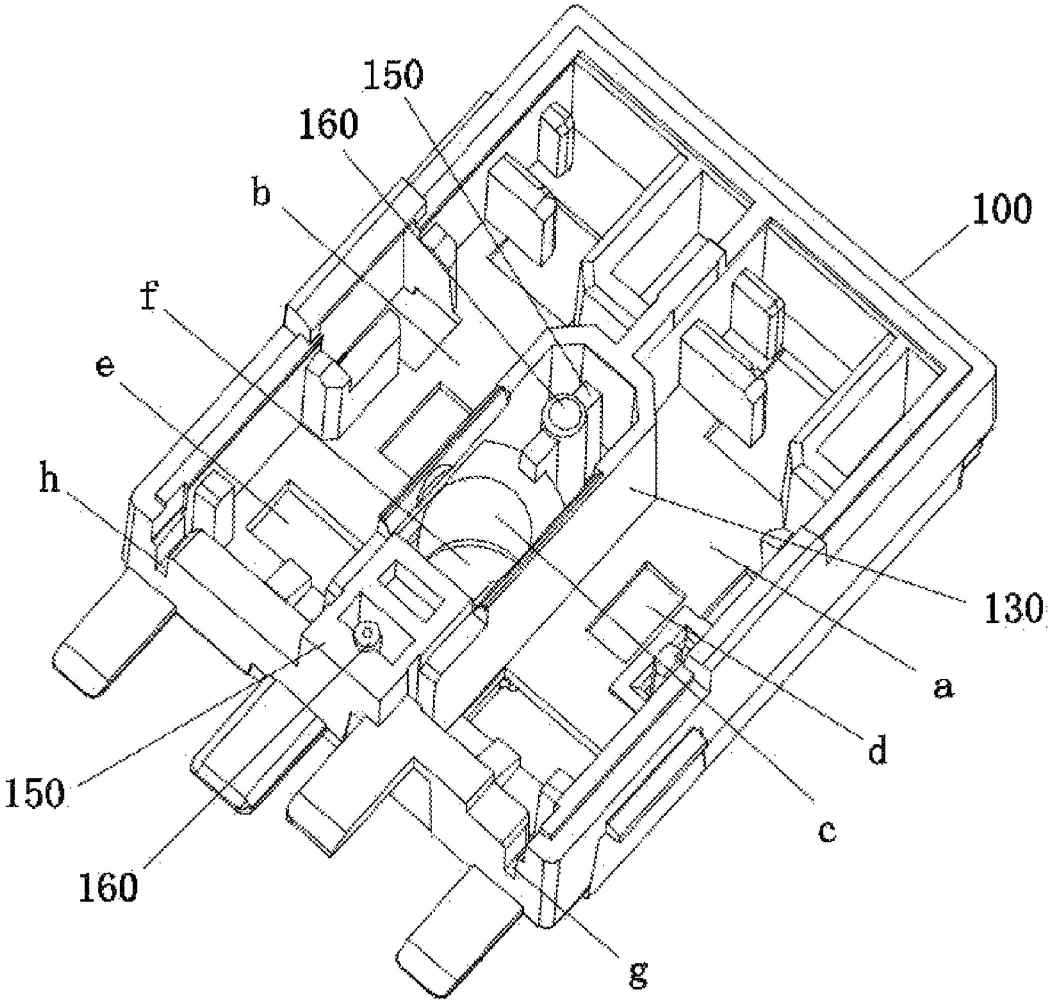
FIG. 7 is a schematic structural diagram of an insulating liner bottom shell.
Figure 8:
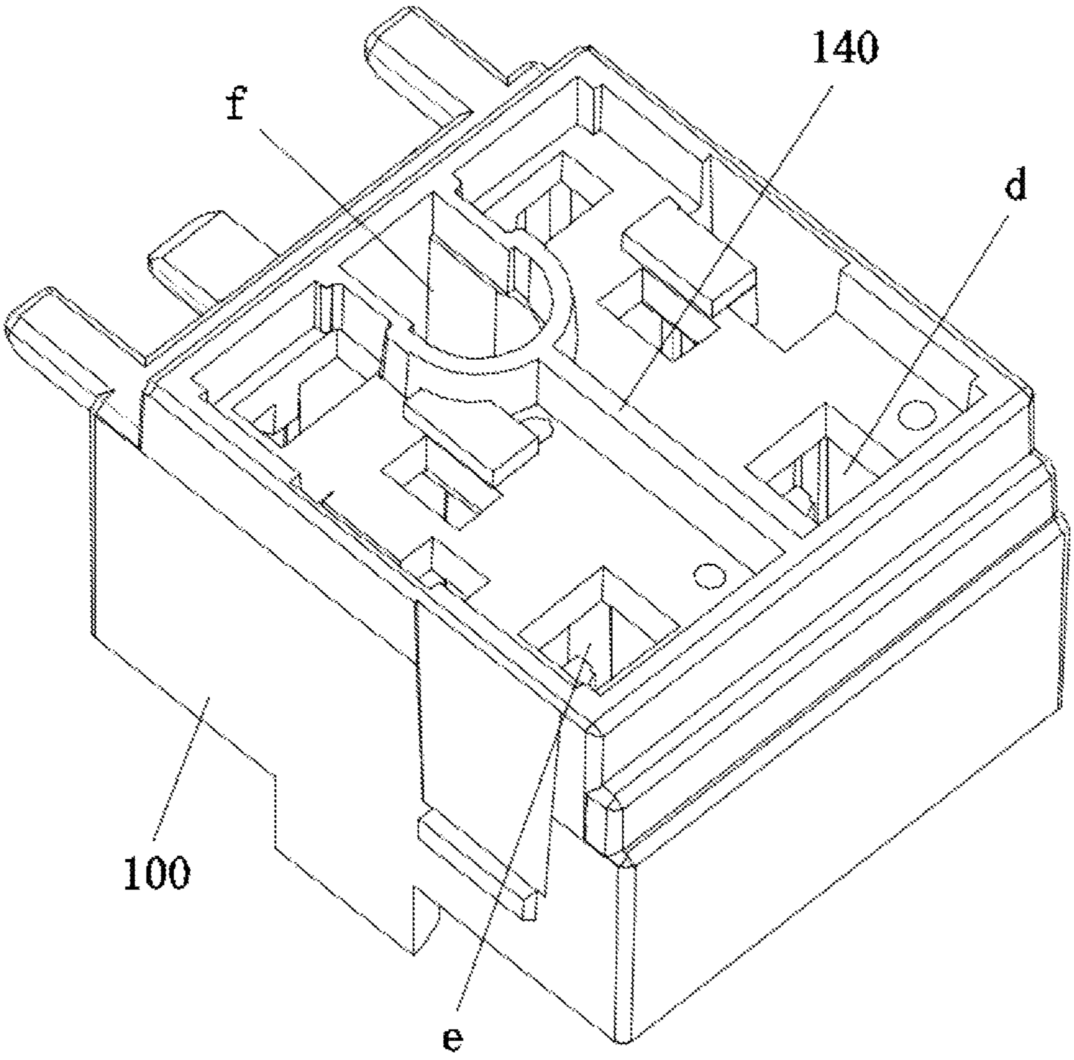
FIG. 8 is a schematic structural diagram of the insulating liner bottom shell from another perspective.

As a preferred solution, referring to FIGS. 6 to 8, a bottom surface of the first cavity a is provided with a plurality of first leakage holes d, and a bottom surface of the second cavity b is provided with a plurality of second leakage holes e. An area of the corresponding socket hole 210 above the first cavity a is smaller than a sum of areas of the plurality of first leakage holes d, and an area of the corresponding socket hole 210 above the second cavity b is smaller than a sum of areas of the plurality of second leakage holes e. Certainly, in some embodiments, one first leakage hole d and one second leakage hole e can be provided, as long as the area of the corresponding socket hole 210 above the first cavity a is smaller than the area of the plurality of first leakage holes d and the area of the corresponding socket hole 210 above the second cavity b is smaller than the sum of the areas of the plurality of second leakage holes e.

The water splashed into the first cavity a and the second cavity b can be instantly discharged through the first leakage hole d and the second leakage hole e, thereby avoiding water accumulation and preventing current from passing through the water to form a loop. Therefore, avoiding accumulation of water can also effectively protect the conductive contact sheet 310. Since the area of the corresponding socket hole 210 above the first cavity a is smaller than the sum of the areas of the plurality of first leakage holes d, and the area of the corresponding socket hole 210 above the second cavity b is smaller than the sum of the areas of the plurality of second leakage holes e, the principle of small inlet and large discharge is adopted to ensure that less water leaks in and a large amount of water is discharged, thereby preventing splashed water from accumulating inside the first cavity a and the second cavity b.

A three-hole socket is taken as an example, referring to FIGS. 1 to 9, three socket holes 210 are provided on the upper end surface of the insulating liner upper cover 200, three conductive sheets 400 are provided, and three conductive contact sheet assemblies 300 are provided, which are respectively an L conductive contact sheet assembly accommodated in the first cavity a, an N conductive contact sheet assembly accommodated in the second cavity b, and a grounded conductive contact sheet assembly. Three partitions are provided, namely a first partition 110, a second partition 120, and a third partition 130. The first partition 110, the second partition 120, and the third partition 130 divide the cavity into the first cavity a, the second cavity b, and a third cavity c for accommodating the grounded conductive contact sheet assembly. A further socket hole 210 of the insulating liner upper cover 200 is located above the third cavity c. A plurality of third leakage holes f are provided on a bottom surface of the third cavity c. An area of the corresponding socket hole 210 above the third cavity c is smaller than a sum of areas of the plurality of third leakage holes f. Certainly, in some embodiments, one third leakage hole f may be provided, and the area of the corresponding socket hole 210 above the third cavity c is smaller than the area of the third leakage hole f.

Reference is made to FIG. 8, in which a raising rib 140 is provided on a lower side of the insulating liner bottom shell 100 to raise the first leakage hole d, the second leakage hole e, and the third leakage hole f. Furthermore, even if water is accumulated on an outside of the insulating liner bottom shell 100, the neutral wire and the live wire cannot form a loop, thereby eliminating the risk of short circuit or leakage.

Reference is made to FIGS. 3 to 6, in which a front end surface of the insulating liner bottom shell 100 is provided with a first crack g from a top edge downward, which spatially communicates with the first cavity a and allows the L conductive contact assembly to extend. The front end surface of the insulating liner bottom shell 100 is provided with a second crack h from the top edge downward, which spatially communicates with the second cavity b and allows the N conductive contact sheet assembly to extend. Accordingly, the L conductive contact sheet assembly and the N conductive contact sheet assembly must extend from the insulating liner bottom shell 100. If water splashes from the outside of the insulating liner bottom shell 100, since the first crack g and the second crack h each have a certain height, it is not easy for water to enter here. Preferably, a lower edge of each of the first crack g and the second crack h is at least 0.5 cm away from the lowermost side of the insulating liner bottom shell 100.

Figure 9:
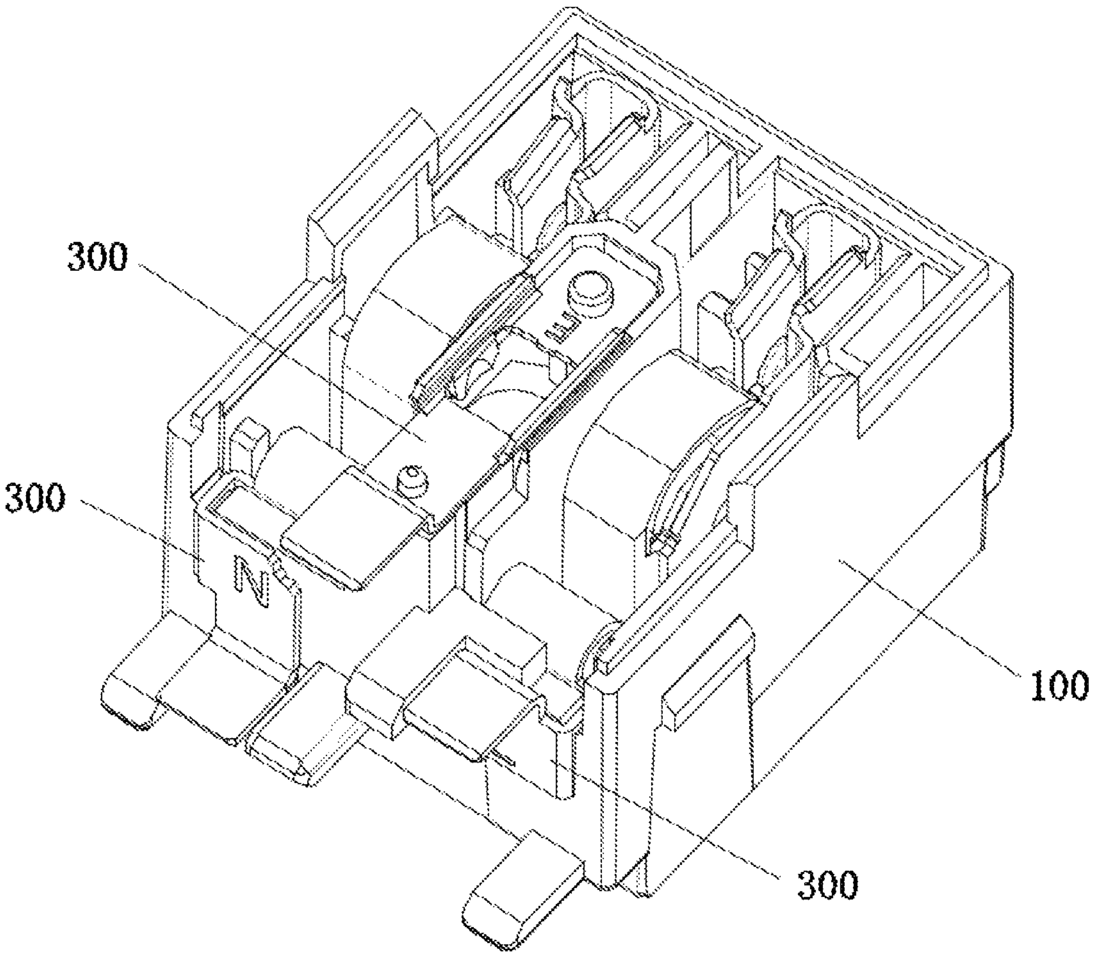
FIG. 9 is a schematic structural diagram of a conductive contact sheet assembly placed on the insulating liner bottom shell.
Figure 10:
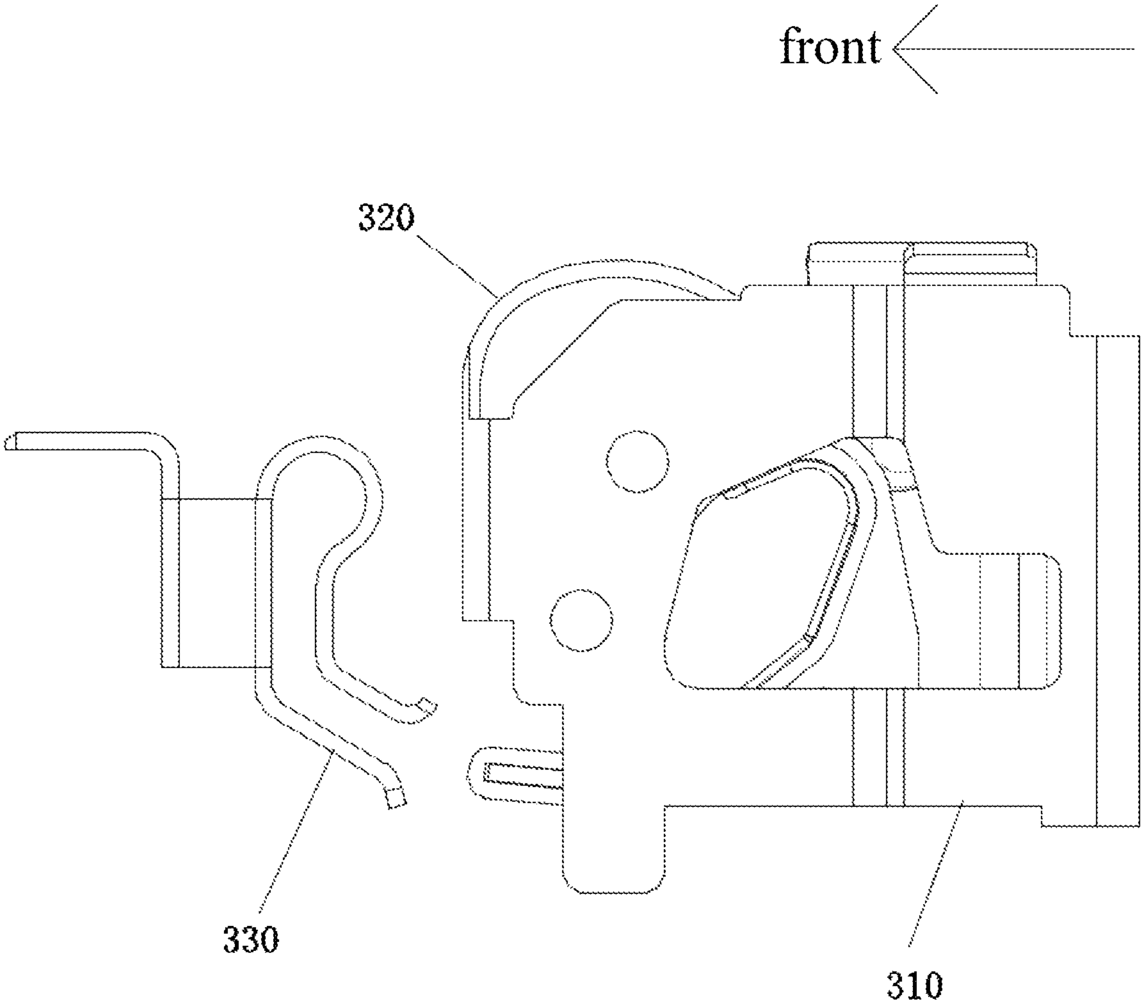
FIG. 10 is a schematic structural diagram of the conductive contact sheet assembly.

Reference is made to FIGS. 6, 7, and 9, in which a support bump 150 is provided in the third cavity c, and a convex column 160 is provided on the support bump 150. The grounded conductive contact sheet assembly 300 passes through the convex column 160 and is placed on the support bump 150. A plurality of ribs that are inwardly protruding are provided on side walls of the first cavity a and the second cavity b, and the plurality of ribs jointly define the positions of the L conductive contact sheet assembly and the N conductive contact sheet assembly, so that the ground conductive contact sheet assembly, the L conductive contact sheet assembly, and the N conductive contact sheet assembly are accommodated in the socket liner shell.

Figure 15:
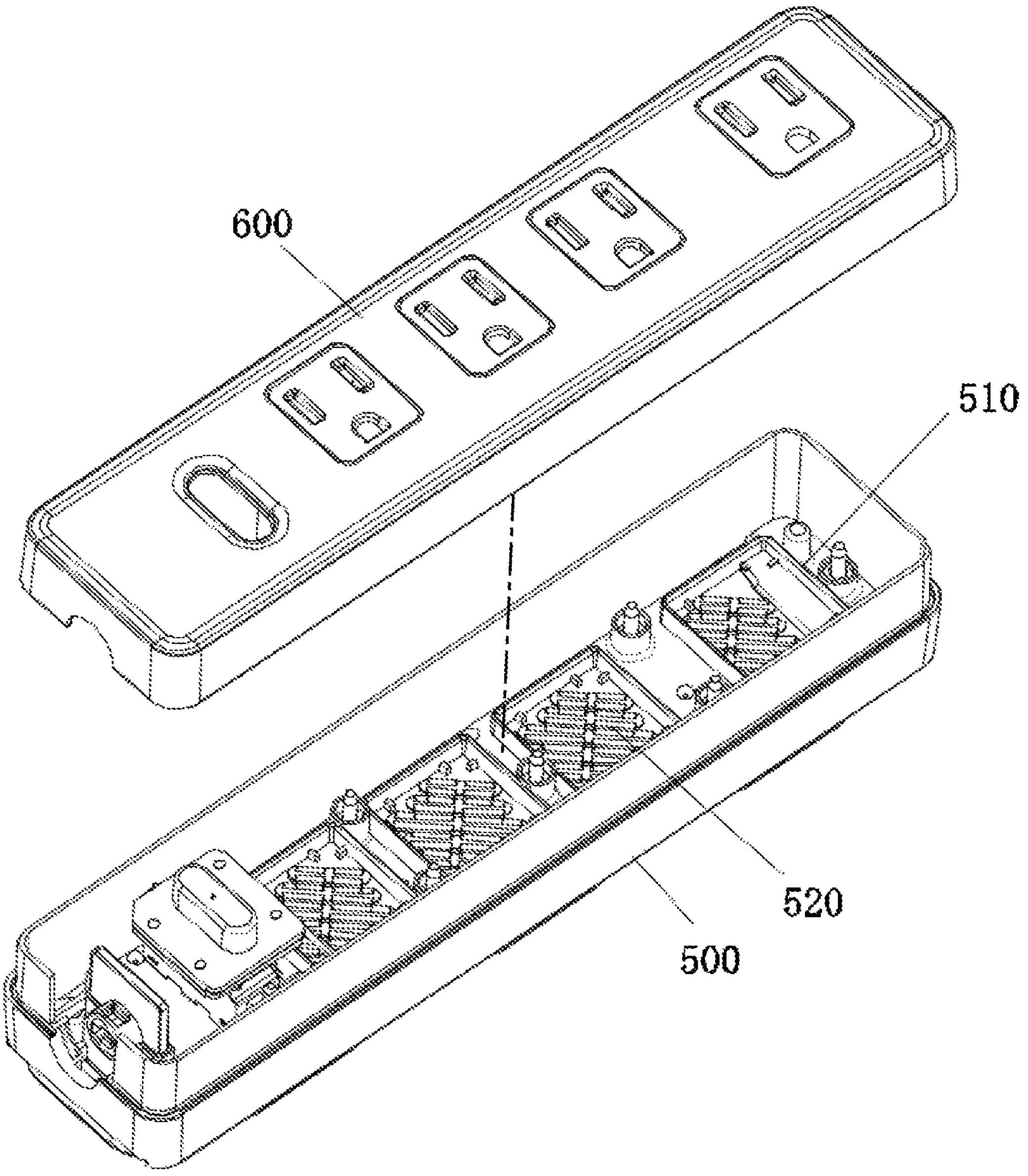
FIG. 15 is a schematic exploded structural diagram of a socket.
Figure 16:
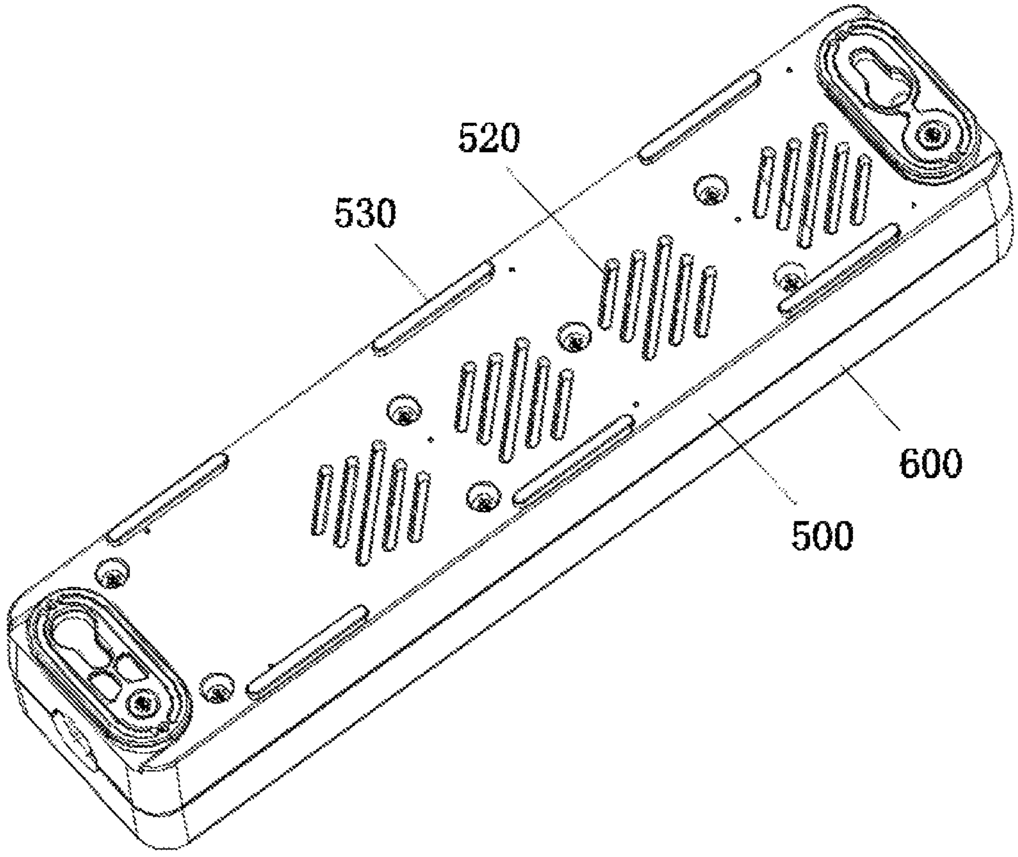
FIG. 16 is a schematic structural diagram of the socket from another perspective.

Reference is made to FIGS. 15 and 16, in which the present disclosure further provides a socket, including an insulating socket bottom shell 500, an insulating socket upper cover 600 covering the insulating socket bottom shell 500, and at least one internal structure of the socket as described above accommodated in the insulating socket bottom shell 500.

In addition to being waterproof and preventing electric shock, the socket can also save electrical energy and reduce carbon emissions.

Conventional sockets consume power when in the standby mode, increasing carbon emissions. As for the socket using the internal structure of the socket of the present disclosure, the contact sheet 330 is disconnected from the conductive elastic member under normal conditions, that is to say, the socket using the present disclosure is in an off-circuit state when no plug is inserted. Therefore, electrical energy loss can be avoided, and carbon emissions can be effectively reduced.

Reference is made to FIGS. 15 and 16, in which an inner bottom wall of the insulating socket bottom shell 500 is provided with surrounding walls 510 protruding from the inner bottom wall of the insulating socket bottom shell 500. The socket liner is assembled on the surrounding wall 510 through the insulating liner bottom shell 100. A plurality of socket leakage holes 520 spatially communicated with the outside are respectively provided within the surrounding walls 510. When water enters the socket hole 210 of the socket, the water flows into the socket liner, then flows out from the leakage hole on the bottom side of the socket liner, and finally flows out from the socket leakage hole 520 of the insulating socket bottom shell 500. The water will not accumulate inside the socket. A raising block 530 is provided on a lower side of the insulating socket bottom shell 500, so that water discharged from the socket leakage hole 520 will not soak into the socket.

The working principle of the present disclosure is substantially as follows. Since the contact sheet 330 is disconnected from the conductive elastic member under normal conditions, even if the user accidentally touches the conductive elastic member adjacent to the socket hole 210, no electric shock will occur. In addition, because the elastic pin 322 of the conductive elastic member partially extends to the lower side of the socket hole 210 and is adjacent to the front side of the socket hole 210, when other objects are mistakenly inserted into the socket hole 210, the elastic pin 322 cannot be squeezed or is difficult to be completely squeezed, so that the conductive elastic member will not be in contact with the contact sheet 330 to be conducted with the contact sheet 330, further reducing the risk of electric shock. Besides, if no plug is inserted into the socket hole 210, since the insulating liner upper cover 200 and the insulating liner bottom shell 100 are not electrified, splashing of water will not cause a short circuit. When power is on and water enters both socket holes 210, the water is distributed into the first cavity a and the second cavity b, and the neutral wire and the live wire cannot form the loop, thereby eliminating the risk of short circuit or leakage. In addition to being waterproof and preventing electric shock, the socket can also save electrical energy and reduce carbon emissions.

The above is only used to illustrate the technical solution of the present disclosure and not to limit it. Other modifications or equivalent substitutions made by those of ordinary skill in the art to the technical solution of the present disclosure can be made. As long as they do not deviate from the spirit and scope of the technical solutions of the present disclosure, they should be covered by the claims of the present disclosure.

What is claimed is:

1. An internal structure of a socket, comprising:

an insulating liner bottom shell (100);

an insulating liner upper cover (200) covering the insulating liner bottom shell (100); and at least two conductive contact sheet assemblies (300) accommodated in the insulating liner bottom shell (100), a part of the conductive contact sheet assembly (300) extending to a front side of the insulating liner bottom shell (100);

wherein the part of the conductive contact sheet assembly (300) extending to the front side of the insulating liner bottom shell (100) is configured to contact a conductive sheet (400) of the socket;

wherein socket holes (210) are correspondingly provided on an upper end surface of the insulating liner upper cover (200);

wherein the insulating liner bottom shell (100) is provided with a cavity for accommodating the conductive contact sheet assembly (300), at least one partition is provided in the insulating liner bottom shell (100), the at least one partition divides the cavity into a first cavity (a) and a second cavity (b) that are independent from each other, one socket hole (210) of the insulating liner upper cover (200) is arranged above the first cavity (a), and another socket hole (210) of the insulating liner upper cover (200) is arranged above the second cavity (b);

wherein one conductive contact sheet assembly (300) is accommodated in the first cavity (a), another conductive contact sheet assembly (300) is accommodated in the second cavity (b), and the conductive contact sheet assembly (300) includes:

a conductive elastic member, including a clamping part (311) located on a lower side of the socket hole (210) for contacting with an external plug electrode, and an elastic pin (322) extending from the clamping part (311) to a front side of the clamping part (311), wherein the elastic pin (322) partially extends to the lower side of the socket hole (210) and adjacent to a front side of the socket hole (210); and a contact sheet (330), wherein the contact sheet (330) is provided separately from the conductive elastic member, arranged on a front side of the elastic pin (322) of the conductive elastic member, and configured to contact the conductive sheet (400);

wherein, when the external plug electrode is inserted, the external plug electrode is in contact with the clamping part (311) of the conductive elastic member while the external plug electrode presses the elastic pin (322) of the conductive elastic member, and the elastic pin (322)

is squeezed to move forward, so that an end of the elastic pin (322) is in contact with the contact sheet (330), and the external plug electrode, the conductive elastic member, the contact sheet (330), and the conductive sheet (400) are sequentially in contact with and conducted with each other; and wherein, when the external plug electrode is pulled out, the external plug electrode is not in contact with the clamping part (311) of the conductive elastic member while the elastic pin (322) is not squeezed by the external plug electrode, so that the elastic pin (322) resets.

2. The internal structure of the socket according to claim 1, wherein the conductive elastic member includes:

a conductive contact sheet (310), wherein the conductive contact sheet (310) has the clamping part (311), and a first fixing part (312) extending from the clamping part (311) to the front side of the clamping part (311); and a conductive spring sheet (320), wherein the conductive spring sheet (320) has a second fixing part (321) fixedly connected to the first fixing part (312) of the conductive contact sheet (310), the elastic pin (322) extending from the second fixing part (321) and having an end arranged on the front side of the elastic pin (322), and a contact head (323) provided at the end of the elastic pin (322).

3. The internal structure of the socket according to claim 2, wherein the elastic pin (322) has:

a base extending part (3224), wherein the base extending part (3224) extends from the second fixing part (321) and has a plurality of bends;

a first extending part (3221), wherein the first extending part (3221) extends obliquely upward from an end of the base extending part (3224);

a second extending part (3222), wherein the second extending part (3222) extends from an end of the first extending part (3221) and bends and extends downward; and a third extending part (3223), wherein the third extending part (3223) extends from an end of the second extending part (3222) and extends downward and forward;

wherein the contact head (323) is arranged at an end of the third extending part (3223).

4. The internal structure of the socket according to claim 2, wherein the conductive spring sheet (320) is made of phosphor copper and the conductive contact sheet (310) is made of brass.

5. A socket, comprising:

an insulating socket bottom shell (500);

an insulating socket upper cover (600) covering the insulating socket bottom shell (500); and the internal structure of the socket according to claim 4 accommodated in the insulating socket bottom shell (500).

6. The internal structure of the socket according to claim 3, wherein the conductive spring sheet (320) is made of phosphor copper and the conductive contact sheet (310) is made of brass.

7. A socket, comprising:

an insulating socket bottom shell (500);

an insulating socket upper cover (600) covering the insulating socket bottom shell (500); and the internal structure of the socket according to claim 6 accommodated in the insulating socket bottom shell (500).

8. A socket, comprising:

an insulating socket bottom shell (500);

an insulating socket upper cover (600) covering the insulating socket bottom shell (500); and the internal structure of the socket according to claim 3 accommodated in the insulating socket bottom shell (500).

9. The internal structure of the socket according to claim 2, wherein a first riveting hole (3121) is provided on the first fixing part (312) of the conductive (310), a second riveting hole (3211) corresponding to the first riveting hole (3121) is provided on the second fixing part (321) of the conductive spring sheet (320), and the second fixing part (321) is fixed to the first fixing part (312) by riveting.

10. The internal structure of the socket according to claim 9, wherein the conductive spring sheet (320) is made of phosphor copper and the conductive contact sheet (310) is made of brass.

11. A socket, comprising:

an insulating socket bottom shell (500);

an insulating socket upper cover (600) covering the insulating socket bottom shell (500); and the internal structure of the socket according to claim 10 accommodated in the insulating socket bottom shell (500).

12. A socket, comprising:

an insulating socket bottom shell (500);

an insulating socket upper cover (600) covering the insulating socket bottom shell (500); and the internal structure of the socket according to claim 9 accommodated in the insulating socket bottom shell (500).

13. A socket, comprising:

an insulating socket bottom shell (500);

an insulating socket upper cover (600) covering the insulating socket bottom shell (500); and the internal structure of the socket according to claim 2 accommodated in the insulating socket bottom shell (500).

14. The internal structure of the socket according to claim 1, wherein a first leakage hole (d) is provided on a bottom surface of the first cavity (a), a second leakage hole (e) is provided on a bottom surface of the second cavity (b), an area of the one socket hole (210) above the first cavity (a) is smaller than an area of the first leakage hole (d), and an area of the another socket hole (210) above the second cavity (b) is smaller than an area of the second leakage hole (e); or wherein a plurality of first leakage holes (d) are provided on the bottom surface of the first cavity (a), a plurality of second leakage holes (e) are provided on the bottom surface of the second cavity (b), the area of the one socket hole (210) above the first cavity (a) is smaller than a sum of areas of the plurality of first leakage holes (d), and the area of the another socket hole (210) above the second cavity (b) is smaller than a sum of areas of the plurality of second leakage holes (e).

15. The internal structure of the socket according to claim 14, wherein three socket holes (210) are provided on the upper end surface of the insulating liner upper cover (200); three conductive contact sheet assemblies (300) are provided, including an L conductive contact assembly accommodated in the first cavity (a), an N conductive contact assembly accommodated in the second cavity (b) and a grounded conductive contact sheet assembly; three partitions are provided, including a first partition (110), a second partition (120), and a third partition (130), wherein the first partition (110), the second partition (120), and the third partition (130) divide the cavity into the first cavity (a), the second cavity (b), and a third cavity (c) for accommodating the grounded conductive contact sheet assembly, and further socket hole (210) of the insulating liner upper cover (200) is arranged above the third cavity (c);

wherein a third leakage hole (f) is provided on a bottom surface of the third cavity (c), and an area of the further socket hole (210) above the third cavity (c) is smaller than an area of the third leakage hole (f); or wherein a plurality of third leakage holes (f) are provided on the bottom surface of the third cavity (c), and the area of the further socket hole (210) above the third cavity (c) is smaller than a sum of areas of the plurality of third leakage holes (f).

16. The internal structure of the socket according to claim 15, wherein a raising rib (140) is provided on a lower side of the insulating liner bottom shell (100) to correspondingly raise the first leakage hole (d), the second leakage hole (e) and the third leakage hole (f).

17. A socket, comprising:

an insulating socket bottom shell (500);

an insulating socket upper cover (600) covering the insulating socket bottom shell (500); and the internal structure of the socket according to claim 15 accommodated in the insulating socket bottom shell (500).

18. A socket, comprising:

an insulating socket bottom shell (500);

an insulating socket upper cover (600) covering the insulating socket bottom shell (500); and the internal structure of the socket according to claim 14 accommodated in the insulating socket bottom shell (500).

19. A socket, comprising:

an insulating socket bottom shell (500);

an insulating socket upper cover (600) covering the insulating socket bottom shell (500); and the internal structure of the socket according to claim 1 accommodated in the insulating socket bottom shell (500).

20. The socket according to claim 19, wherein an inner bottom wall of the insulating socket bottom shell (500) is provided with surrounding walls (510) protruding from the inner bottom wall of the insulating socket bottom shell (500), the internal structure of the socket is assembled on the surrounding wall (510) through the insulating liner bottom shell (100), a plurality of socket leakage holes (520) spatially communicated with an outside are respectively provided within the surrounding walls (510), and a raising block (530) is provided on a lower side of the insulating socket bottom shell (500).

* * * * *